Dec. 6, 1955 R. M. SHIRK 2,726,146
GAS SOLID CONTACTING AND SEPARATION TOWER
Filed Sept. 27, 1951 3 Sheets-Sheet 2
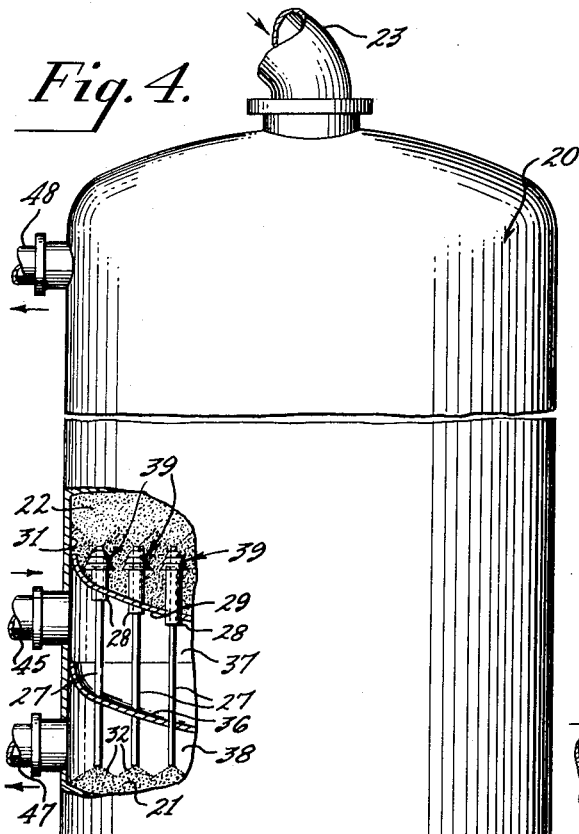
Fig. 4.
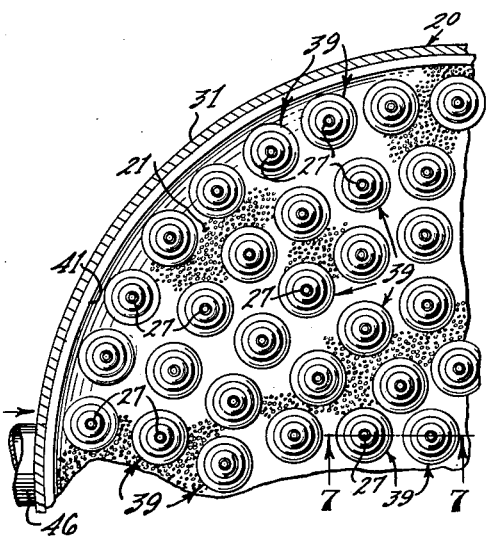
Fig. 5.
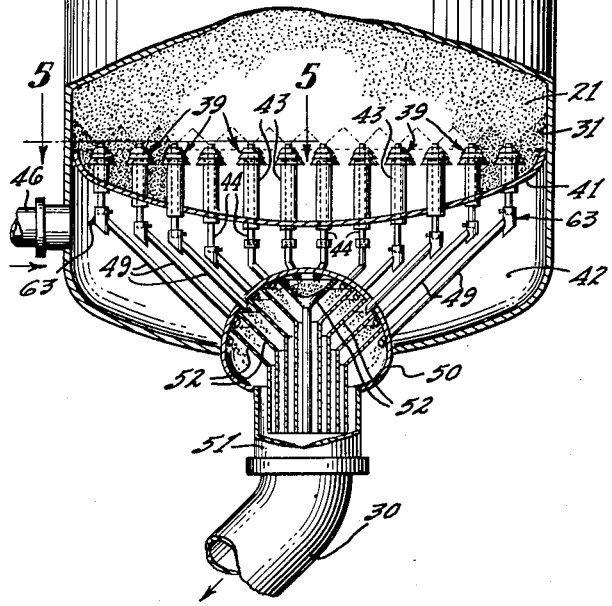
INVENTOR
Robert M. Shirk
BY
William Klabunde
ATTORNEY

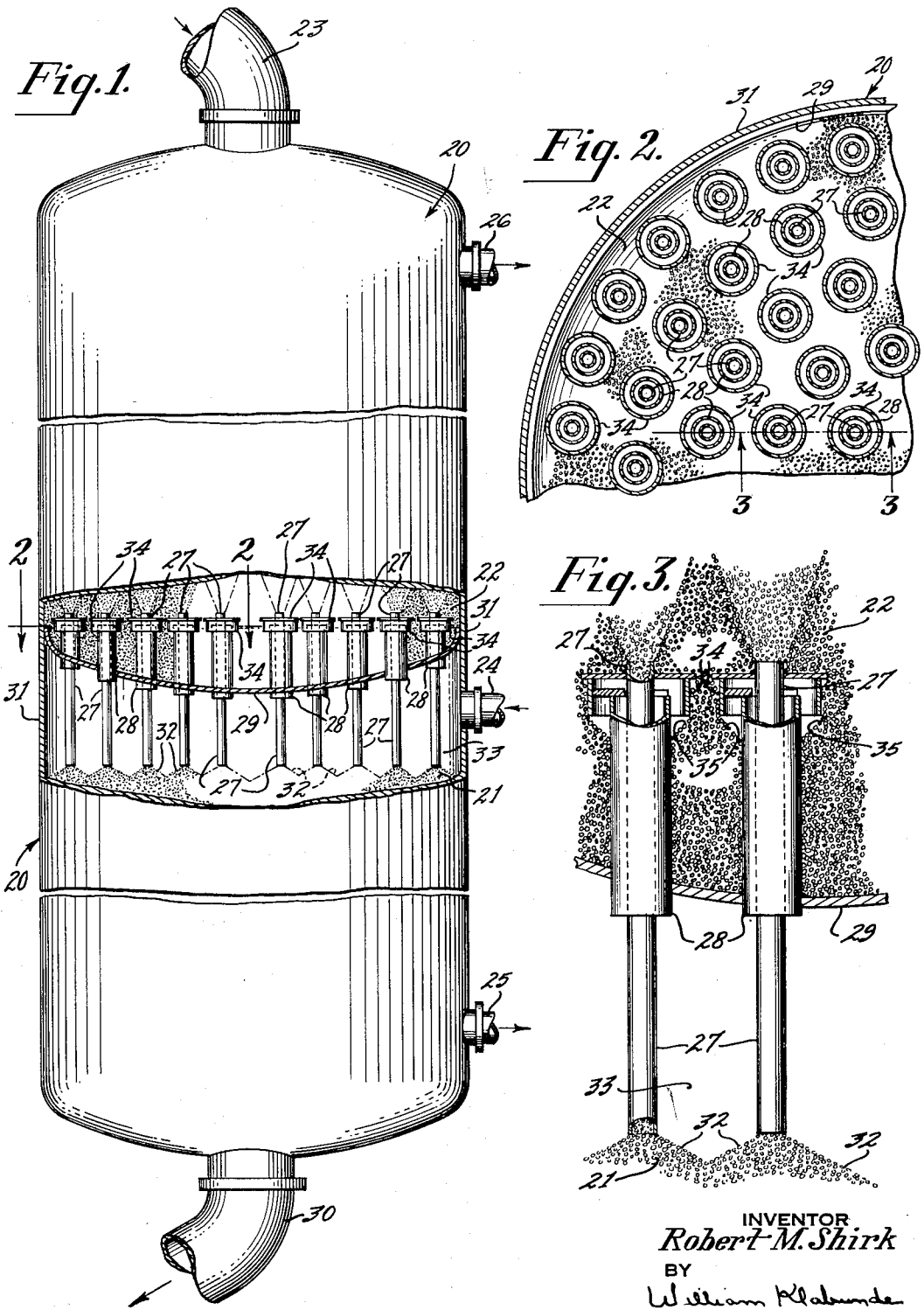

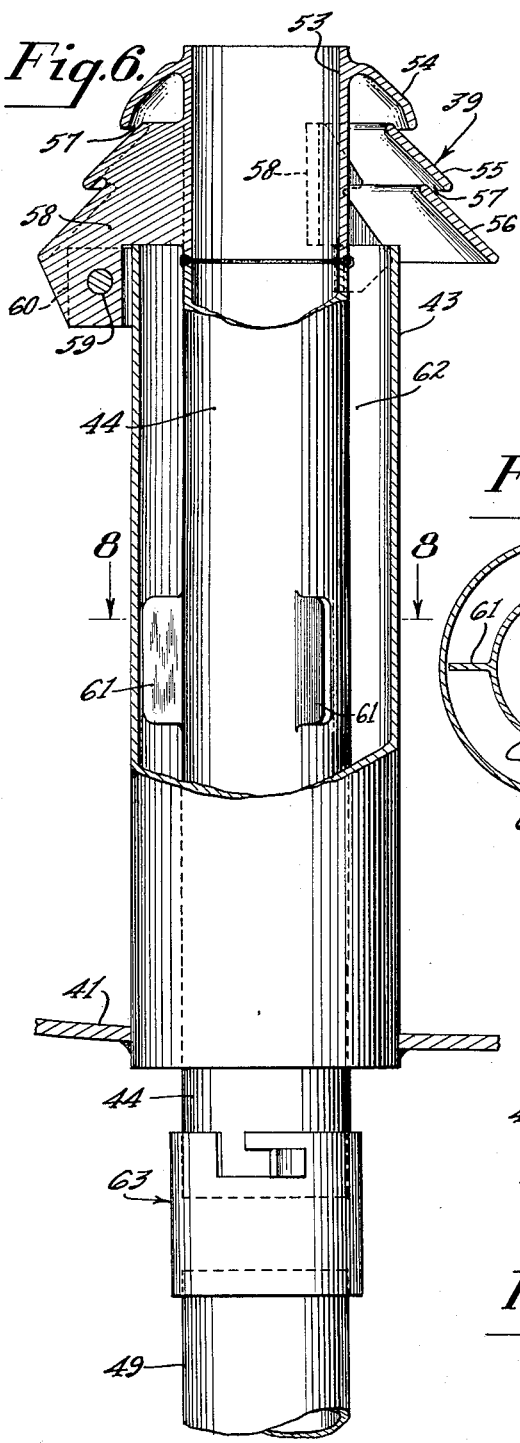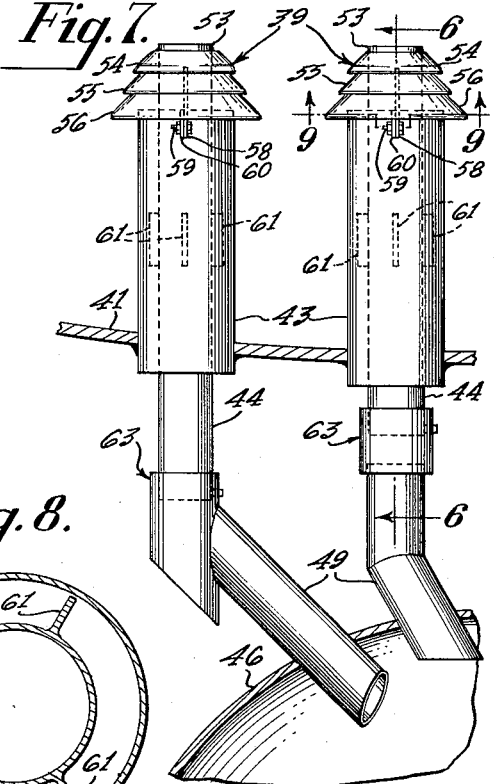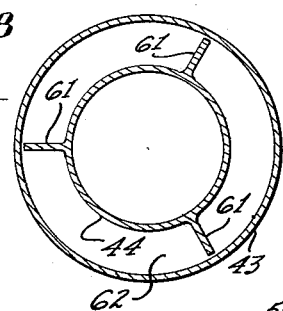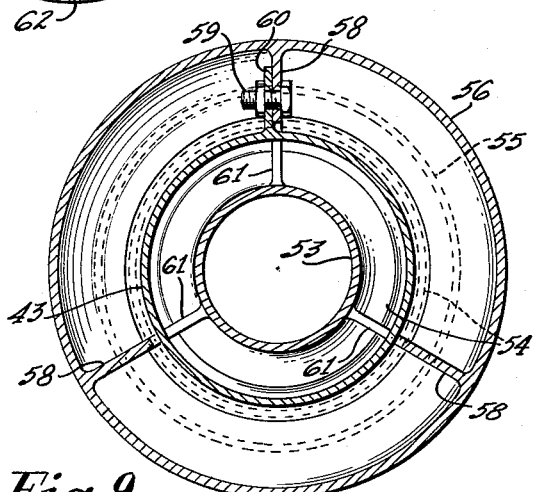

United States Patent Office 2,726,146
Patented Dec. 6, 1955

2,726,146
GAS SOLID CONTACTING AND SEPARATION TOWER

Robert M. Shirk, Wilmington, Del., assignor to Houdry Process Corporation, Wilmington, Del., a corporation of Delaware Application September 27, 1951, Serial No. 248,596

13 Claims. (Cl. 23—288)

The present invention relates to contacting of solids and gases, and is particularly concerned with improved operations and arrangements for passing gases and vapors through gravitating beds of solid contact materials. An important application of the invention is in connection with hydrocarbon conversion systems of the compact moving bed type.

The use of moving bodies or beds of solid particles or granules in processes that involve the contact of masses of such solid particles with fluids, as for example, catalytic conversions of organic vapors by solid catalysts, has resulted in considerable advantages, due to the continuous nature of the process, but has also been attended by operating difficulties occasioned by limitations inherent in the manner in which solid particles flow. Various disadvantages in presently used processes involving the engagement of gaseous material with, and subsequent countercurrent flow thereof through, a downwardly moving bed of fluent solid particles in a contact zone may be overcome using methods and apparatus embodying the present invention, as discussed more fully below.

The general technique for use of downwardly moving compact non-turbulent beds of fluent solid particles as contact masses in process zones, such as reaction or catalyst regeneration zones, is adequately set forth in the technical literature and, hence, does not need to be reviewed here. For a disclosure of the application of this technique to the catalytic cracking of hydrocarbons, reference may be made to an article entitled "The 'T. C. C.' cracking process for motor gasoline production," by R. H. Newton, G. S. Dunham, and T. P. Simpson, in "Transactions of the American Institute of Chemical Engineers," volume 41, page 215, April 25, 1945, and the other articles therein cited; and for its application to the use of fluent inert particles for pyrolytic conversions, reference may be made to an article entitled "Thermofor pyrolytic cracking," by S. C. Eastwood and A. E. Potas, in "Petroleum Processing," volume 3, page 837, September 1948. Although the present invention is useful in connection with a wide variety of processes, it will, for convenience and brevity, be described in terms of hydrocarbon conversion processes, particularly cracking. Those skilled in the art will be able to apply the process and apparatus set forth herein to other fields and uses.

As noted above, the flow of granular solids in bed form has inherent properties or characteristics that operate as limitations on the use of such solids as contact masses. One characteristic of solids flow associated with the present invention is that, when such solids flow or discharge through an opening at the bottom of a vessel containing a bed of such solids, there is flow or movement substantially only in an inverted frusto-conical zone extending into the bed above the opening, the bottom of the frusto-conical zone being coextensive with the opening and the outwardly tapering sides of the zones being inclined to the horizontal at the angle of flow, which is generally of the order of about 70°. The granular solids outside of this zone are static or, at best, slowly moving; hence, the downward movement of the bed in regions outside the frusto-conical zone is not uniform, a condition encountered when there is a single central outlet of relatively small diameter. Consequently, uniformity of downward flow over the entire horizontal cross-sectional area of the bed is achieved by discharging the solids at numerous locations or points regularly arranged over the horizontal cross-sectional area of the bottom of the bed, so that there are many inverted frusto-conical zones of flow which intersect each other a short distance above the points of discharge. Typical of the devices commonly used for achieving uniform flow under such conditions are those set forth in U. S. Patent No. 2,412,135 to L. P. Evans, issued December 3, 1946, which patent contains a more detailed discussion of the problem.

Another problem is encountered when flowing gas countercurrently to the downwardly moving bed of granular solids. It is a common practice to introduce such gas into the moving bed through one or more gas distributing devices shaped to deflect or baffle the downward flow of granular solids. Such devices form solids-free spaces having as a lowermost boundary internally exposed surfaces of the moving bed through which the granular solids are contacted with gas. The exposed surfaces are disposed uniformly over the horizontal cross-sectional area of the bed in order to effect uniform introduction and upward flow of the gas. Characteristic of such gas distributing devices is a central beam communicating with spaced parallel inverted channels positioned normally to the beam and lying in a common horizontal plane, as illustrated, for example, in U. S. Patent to L. F. Strader, No. 2,480,887, issued September 6, 1949.

In known commercial installations where the gas distributing or disengaging device is placed in the bottom of the bed above the solids withdrawal device, physical access to these two devices for the purpose of inspection, repair, etc., must be provided by spacing them a minimum distance, such as 2 to 4 feet apart. Under such conditions, there is necessarily a portion of the bed through which gas does not pass, which portion, in a sense, constitutes a waste of useful volume. Another limitation encountered in practical operation is that the rate of gas flow upwardly in the restricted area of the bed surrounding the gas distributing device should not exceed velocities that cause turbulence or lifting of the granular solids, with consequent prevention or disruption of the downward flow of the solids. In commercial installations where the top of the bed of solids forms the bottom of a plenum chamber for the withdrawal of gas, an imposed limitation is that the lateral velocity of the gas should be low enough to avoid disturbance of the surface of the bed.

The present invention affords a simple, sturdy, and compact apparatus involving an efficient improved method for achieving the physical manipulations discussed above. In accordance with the invention, solids withdrawal and gaseous fluid introduction are simultaneously effected in the lower region of a compact moving bed of solids contained within a contact zone or chamber by withdrawing the solids as compact moving streams through a plurality of confined vertical paths having their inlet ends uniformly distributed over a horizontal area within and near the bottom of the moving bed. The confined paths terminate a substantial distance below the moving bed and discharge the streams of solids onto a confined compact moving column of the same, which column may be a second bed contained within a lower contact zone. The space surrounding the portions of the confined paths which extend below the moving bed forms a plenum into which gaseous fluid from an external source is initially introduced. The lowermost boundary of the plenum may be a confining wall surface, or it may be the surface of a second compact moving bed formed by the discharge of solids from said confined paths. In the latter case, the vertical dimension of the plenum is such as to assure that the velocity of the gaseous fluid flowing laterally across the exposed surface of the lower solids bed will not be sufficient to cause substantial solids entrainment in the fluid stream.

The gaseous fluid introduced into the plenum is passed upwardly into the first-mentioned compact moving bed along a plurality of confined annular fluid paths individual to and surrounding the uppermost portions of the confined vertical solids paths. The gaseous fluid is introduced into the lower region of the compact moving bed through exposed surfaces of the mass of flowing solids formed beneath solids-deflecting baffles which concentrically encircle the inlet ends of the confined vertical solids paths.

Following its engagement with the compact mass of solids, the gaseous fluid passes upwardly through the bed, the flow of gas being relatively uniform throughout the horizontal area of the bed, without substantial channelling or non-uniform flow through vertical portions thereof. In all cases, the plenum and at least a substantial major portion of the solids withdrawal system are contained within the same vertical limits, thereby effecting a substantial saving in vertical height of the vessel containing the contact zone or zones.

The principles involved in the present invention are set forth in detail below in connection with the description of the drawings, in which:

Fig. 1 is an elevational view in partial section of a vessel containing a moving bed of solid particles within a contact zone, and arranged to effect contact between the particles and a gas, the view illustrating an embodiment of the invention in which a surface of solids forms a boundary of the plenum;

Fig. 2 is an enlarged fragmentary horizontal section taken along the line 2—2 of Fig. 1, and showing the relationship of the internal structure of the vessel at this level;

Fig. 3 is an enlarged elevational view in partial section of several of the internal conduits shown in Fig. 1, the section plane being indicated by line 3—3 of Fig. 2;

Fig. 4 is a view similar to Fig. 1 illustrating another embodiment of the invention in which the plenum is wholly sealed from contact with the solids.

Fig. 5 is an enlarged fragmentary horizontal section taken along the line 5—5 of Fig. 4, and showing the relationship of the internal structure of the vessel at this level;

Fig. 6 is an enlarged elevational view in partial section of one of the engager conduits shown in Fig. 4, the illustrated embodiment being an alternative form of the conduit shown in Fig. 3;

Fig. 7 is an enlarged elevational view of several of the conduits shown at the bottom of Fig. 4, the section plane being indicated by the line 7—7 of Fig. 5; and Figures 8 and 9 are horizontal sections taken, respectively, along the line 8—8 of Fig. 6 and 9—9 of Fig. 7.

Referring to the drawings, Fig. 1 shows a vessel, such as a regeneration vessel or kiln, indicated generally at 20, which comprises a plurality of contact or regeneration chambers, stages or zones, each containing a downwardly moving bed of particle-size hydrocarbon conversion catalyst. The lowermost contact zone is indicated generally at 21, and the uppermost at 22. Fluent solid particles in the size range of from about 50 mesh to about 0.5 inch, and comprising coked solid hydrocarbon conversion catalyst, such as granules of acid-activated montmorillonite clay, synthetic silica-alumina gel in pellet or bead form, or particles of other solid refractory inorganic compositions known by those skilled in the art to be hydrocarbon cracking catalyst, are introduced to vessel 20 through conduit 23. The particles of coked hydrocarbon conversion catalyst introduced by conduit 23 gravitate downwardly through housing 20 as a compact non-turbulent mass, and are contacted under combustion conditions by oxygen-containing gas introduced at an intermediate level along the vessel 20 through conduit 24. The resultant flue gas, after countercurrent flow with respect to the solid particles through zone 22 and concurrent flow through zone 21, is disengaged in known manner from the particles and removed by conduits 25 and 26.

The conditions of contact and the amount of oxygen-containing gas present in the upper regeneration zone may be controlled in known manner by the use of internal cooling coils within zone 22 and valves in conduits 23 and 24, neither of which are shown, so that only a portion of the coke deposit is removed during travel of the particles through bed 22. Additional removal of coke is effected by that portion of the oxygen-containing gas introduced by conduit 24 which travels downwardly under combustion conditions, through bed 21, as will be more fully described below.

In the embodiments of the invention illustrated in Figures 1 and 4, the particles of partially regenerated catalyst are removed from the uppermost regeneration zone or chamber 22 through a plurality of vertical conduits 27 spaced substantially uniformly over the horizontal cross-sectional area of vessel 20, and having their upper and lower ends terminating, respectively, in common horizontal planes, within zones 22 and 21. Conduits 27 are concentrically spaced within and supported by shorter vertical conduits 28 set in a dished tube-sheet 29 partitioning zones 21 and 22 of vessel 20. Conduits 28 are of substantially greater diameter than conduits 27, so that the pressure drop of the gas flowing through the annular spaces therebetween will be negligible, thus minimizing differences in flow rate through the various annuli created by differences in length of the annular passages. The upper ends of conduits 28 terminate in a common plane located a relatively short distance below the upper ends of conduits 27. The lower ends of conduits 28 terminate just below the tube-sheet or partition 29. The lower ends of conduits 27 terminate in a common plane a considerable distance below partition 29. Because of the compact mass formation of the solids, such plane determines the uppermost level of the moving bed or contact zone 21, which level is maintained in known manner by controlled removal of the solids from the lower end of vessel 20 through outlet conduit 30.

Partition 29, which supports the moving bed 22, is in turn supported by conventional means from the wall 31 of vessel 20, the support being such as to prevent a downward flow of solids other than through conduits 27, and to confine the flow of gas upwardly into zone 22 substantially entirely to the annular passages formed between conduits 27 and 28, except for such minor amounts as may pass through the confined streams of solids in conduits 27.

After passing downwardly through the passageways of vertical conduits 27, the confined, compact streams or columns of granular solids discharge and flow outwardly as expanding streams onto the upper surface 32 of bed 21, as shown in Fig. 1 and in the upper cut-out portion of Fig. 4. Surface 32 of bed 21, partition 29, and wall 31 of vessel 20 define a solids-free plenum or chamber 33 traversed by the conduits 27. Oxygen-containing gas, such as air, introduced to vessel 20 through conduit 24 flows laterally into and fills plenum 33. A portion of this gas, the amount depending on various factors known to the art, passes downwardly through bed 21. By known devices, not shown, the gas is disengaged from the solids in the lower region of bed 21 and is thereafter discharged from vessel 20 through conduit 25.

In accordance with one aspect of the invention, the remainder of the oxygen-containing gas passes upwardly through the annular passageways formed between conduits 27 and 28. Since the rising gas envelopes conduits 27 along their entire length, the gas is in indirect heat exchange relation with the confined streams of granular solids passing downwardly through conduits 27. When the gas is introduced at a temperature substantially lower than that of the granular solids, for example at about 200–900° F., the attendant heat-exchange will serve advantageously to cool the solids, and to heat the oxygen-containing gas to a level which will aid the desired combustion.

As the annular streams of oxygen-containing gas emerge from the upper ends of conduits 28, they are deflected outwardly and then downwardly around the upper periphery of conduits 28 by a plurality of circular caps or baffles 34 mounted adjacent the upper ends of tubes 27, as shown in Figs. 1 and 3. The caps 34, and through them the tubes 27 are supported by the upper ends of tubes 28 and serve to shield the latter against the admission of solids. The downwardly moving gas enters the free or engaging surfaces 35 of granular solid created beneath caps 34, which surfaces are, in general, inclined at the angle of static repose of the particular granular hydrocarbon cracking catalyst employed. Within the bed of granular solids, the gas again reverses its direction of flow and passes upwardly through the static mass of particles between caps 34, then through the downwardly moving portion of the bed 22, and finally out of the vessel 20 through conduit 26. Because caps 34 are uniformly distributed over the horizontal cross-sectional area of the bed and lie in a common horizontal plane, as can be seen from Figs. 1 and 2, a very uniform horizontal distribution and upward flow of gas is achieved.

Although the present invention may be employed to effect simultaneous countercurrent and concurrent flow of the gas in respect to the flow of granular solids in two adjacent process zones, as described in connection with Figures 1, 2 and 3, it may be employed also in conjunction with other types of flow in adjacent process zones. Thus, in the embodiment illustrated in Fig. 4 countercurrent flow is achieved in each of two adjacent superimposed zones.

In the embodiment illustrated in Figures 4 and 5, in which elements identical with elements shown in Figures 1, 2 and 3 are correspondingly numbered, a second laterally disposed tube-sheet, partition or baffle 36 is placed a short distance below tube-sheet 29. Conduits 27 are extended downwardly through and below the second baffle 36, and terminate, as in the case of Fig. 1, in a common horizontal plane a substantial distance below. Baffles 29 and 36, together with wall 31 of vessel 20, define or bound an upper intermediate plenum or chamber 37, and baffle 36 and the surface 32 of bed 21, together with wall 31, define a lower intermediate plenum or chamber 38. Caps 39, differing from caps 34 but performing the same function, are attached to the upper ends of tubes 27. As in Fig. 1, the granular solids discharged from conduits 27 flow downwardly as a compact moving bed 21. A tube-sheet or baffle 41 is spaced above and adjacent the bottom of vessel 20 so as to support the bed 21 and to form a plenum or chamber 42 at the lower end of the vessel. Baffle 41 may be affixed to wall 31 in a manner similar to that used in affixing baffles 29 and 36.

A plurality of short vertical conduits 43, similar in function to conduits 28, are set in tube-sheet 41. A plurality of conduits 44, similar in function to conduits 27, pass concentrically through conduits 43 and serve to remove confined streams of granular solids from the bottom of bed 21. The annular spaces formed between conduits 43 and 44 provide passageways for the flow of gas between plenum 42 and the bed 21.

Oxygen-containing gas is introduced into plenum chambers 37 and 42 through conduits 45 and 46, respectively. The gas passing upwardly through bed 21 is disengaged at the irregular surface 32, and is removed from the gas-collecting plenum 38 through outlet line 47. The gas passing upwardly through moving bed 22 is disengaged from the solids in known manner and removed from vessel 20 through outlet line 48.

The confined compact streams or columns of granular solids traversing the conduits 44 discharge into the upper ends of sloping conduits 49 which converge downwardly toward the axis of vessel 20. To obtain continuous flow of the solids, conduits 49 are arranged at an angle to the horizontal greater than the angle of repose of the solids, such as about 45° or greater.

The lower ends of conduits 49 extend through the wall of a housing 50 centrally located in the bottom wall of vessel 20, the lower end of the housing being provided with an outlet nozzle 51 connected to the solids outlet line 30.

A plurality of nested concentrically spaced funnels 52 are located within the housing 50, the upper ends of the funnels being joined, as by welding, to the inner wall of the housing, and the lower discharge ends being arranged in a common horizontal plane within the nozzle 51. Each funnel 52, and the space between the outermost funnel and the housing 50, receives the discharge of granular solids from a plurality of conduits 49, the arrangement being such as to effect a uniform withdrawal of solids from the bed 21. For a clearer understanding of the method and apparatus for withdrawing the solids uniformly from the contact zone and transferring them to the outlet line, reference may be had to the aforementioned Patent No. 2,412,135, which discloses a somewhat similar arrangement. The withdrawn catalyst is passed downwardly through conduit 30 in the form of a compact moving column and may be transferred to the introduction zone of a pneumatic or mechanical conveyor, not shown, through which the solids are elevated in known manner to the top of a hydrocarbon conversion vessel, or reactor. Alternatively, the withdrawn solids may be passed, by gravity flow, through conduit 30 directly to a processing vessel, not shown, located below the vessel 20.

Referring to the lower portion of Fig. 4, the gaseous material introduced into the plenum 42 through inlet conduit 46 is passed, out of contact with any solids material, upwardly through the annular spaces formed between concentric conduits 43 and 44. The gaseous material discharges into the static mass of solids located in the region of the mass 21 surrounding the engager devices 39. Since the bottom of the moving portion of bed 21 is roughly defined by a plurality of cones having their axes coincident with the axes of conduits 44, as shown by the broken lines in Fig. 4, the gaseous material must pass through a region of static or stagnant solids before it reaches the moving portion of the bed 21.

For a clearer understanding of the type of engager cap 39 illustrated in Fig. 4, and of the devices for connecting conduits 44 with conduits 49, reference may be had to Figs. 6 to 9.

Engager cap 39 comprises a shaped or molded tubular element 53 attached, as by welding, at its lower end to the upper end of conduit 44 and forming an extension thereof. A plurality of vertically-spaced frusto-conical skirt members 54, 55 and 56 are attached to the outer periphery of tubular member 53, the skirts being arranged in spaced overlapping relationship, so as to form downwardly sloping annular passages 57 therebetween. The uppermost skirt 54 is joined along its upper edge to the outer surface of tubular member 53 adjacent its upper end. Skirt members 55 and 56 are supported from tubular member 53 by radial web portions 58, which may be formed integral with or attached to the connected members. The lower edges of radial web portions 58 rest on the upper edge of conduit 43, thus supporting the conduit 44 therein. Web 58 is extended downwardly at its outer end, and the extended portion is secured, as by a bolt or rivet 59 to a radially extending lug 60 attached to the outer surface of conduit 43 adjacent its upper end. In order to maintain the concentric position of conduit 44 within conduit 43, a plurality of radial spacers 61 are attached along their inner edges to the outer surface of conduit 44, as shown in Figs. 6 and 8.

The lower edge of the lowermost skirt member 56 is at a lower elevation than the upper end of conduit 43, so that gaseous material passing upwardly through the annular space 62, formed between the conduits 43 and 44, is required to reverse its direction of flow in order to enter the exposed surfaces of the bed 21 extending downwardly and inwardly toward the axis of conduit 44 from the lower perimeter of each skirt member. Since the moving catalyst in bed 21 enters conduit 44 in a cone of movement diverging upwardly and outwardly from the upper end of tubular member 53, it is apparent that the gaseous material discharges at a plurality of spaced levels, defined by the lower edges of skirts 54, 55 and 56, within the static or stagnant portion of the compact mass 21.

In order to facilitate the dismantling and removal of the engager elements and the solids withdrawal conduits 44, the lower ends of the latter may be removably connected to the upper ends of conduits 49 by bayonet-type connections shown in Figs. 6 and 7, and generally indicated by the reference numeral 63.

The invention above described provides a simple method and apparatus for engaging a compact mass of granular material contained within a contact zone with gaseous material, and for effecting uniform withdrawal of the solids from the contact zone within a minimum vertical space, thereby effecting a considerable saving in the height requirements for the vessel containing the contact zone. The gaseous material is introduced into the vessel and passed through the various engager devices into the compact bed of solids without previous contact with the solids material.

Obviously many modifications and variations of the invention as hereinbefore set forth may be made without departing from the spirit and scope thereof, and therefore only such limitations should be imposed as are indicated in the appended claims.

What is claimed is:

1. In apparatus for contacting gas with granular solids gravitating in compact flow comprising a vessel, means for introducing solids into the upper end of said vessel, and means for withdrawing solids from the lower end thereof, the combination therewith of at least one tube-sheet extending across said vessel at an intermediate level therein, a gas inlet to said vessel below and adjacent to said tube-sheet, a gas outlet from said vessel spaced a considerable distance above said tube-sheet, the portion of said vessel between said tube-sheet and said gas outlet comprising a contact zone, a plurality of vertical gas-conducting tubes having their lower ends set in said tube-sheet and their upper ends extending a substantial distance into the lower region of said contact zone, deflecting caps supported axially above said gas-conducting tubes and having their sides extended downwardly around and spaced radially from the upper ends of said tubes, and a plurality of individual solids-discharge tubes extending centrally through said gas-conducting tubes, said solids-discharge tubes being supported at their upper ends within central openings in said deflector caps and having their lower ends extending downwardly a substantial distance below said gas inlet, said deflector caps being laterally spaced sufficiently to afford free passage of said solids therebetween to the bottom region of said contact zone.

2. Apparatus as defined in claim 1 in which said second conduits are of equal length and are disposed at a common level within said vessel.

3. Apparatus as defined in claim 1 in which said tube-sheet is spaced from the lower end of said vessel a distance sufficient to provide a second contact zone below said first contact zone, and including gas discharge means at the lower end of said second contact zone.

4. Apparatus as defined in claim 1 comprising a plurality of said tube-sheets spaced from the upper end of said vessel and from each other to provide a plurality of said contact zones, the solids discharge tubes of the lowermost tube-sheet comprising upper vertical portions and sloping lower portions all converging to discharge into said means for withdrawing solids from the lower end of said vessel, transverse baffles extending across said vessel below each of the remaining tube-sheets and having openings through which extend the lower end portions of said gas-conducting tubes, each of said remaining tube-sheets being located at a level between the gas outlet of one contact zone and the gas inlet for the contact zone next above.

5. Apparatus as defined in claim 1 in which each of said solids-discharge tubes comprises an upper vertical section extending through its corresponding gas-conducting tube, a separate lower section sloping downwardly to said means for withdrawing solids from the lower end of said vessel, and means for detachably coupling said upper and lower sections.

6. In a gas-solids contact vessel having a tube-sheet separating an upper gas-solids contact zone from a lower gas supply zone, a device for simultaneously removing a compact moving stream of said solids from said upper zone and introducing gas thereto from said lower zone comprising a vertical conduit having its lower end portion set in said tube-sheet and its upper end extending a substantial distance thereabove, a second conduit extending concentrically through the first conduit and forming an annular passage therebetween, the ends of said second conduit extending a substantial distance beyond the ends of said first conduit, annular solids-deflecting means extending outwardly and downwardly from said second conduit adjacent its upper end and forming an annular cap overhanging the upper end of said first conduit, the lower perimeter of said solids-deflecting means being located a substantial lateral distance from the upper end portion of said first conduit, and radial members extending inwardly from the inner side walls of said solids-deflecting means and resting upon the upper end of said first conduit.

7. A device as defined in claim 6 in which said solids-deflecting means is provided with at least one circumferential louver, the horizontal edges of said louver being located substantially at the same level, with the portion of said solids-deflecting means above said louver overlapping the portion below said louver.

8. A device as defined in claim 6 in which said solids-deflecting means comprises an inverted cup-shaped member having a central opening in the bottom thereof adapted to secure the upper end portion of said second conduit, and means extending across the gap between said solids-deflecting means and said second conduit adapted to support the latter upon the upper end of said first conduit.

9. The device of claim 6 including a third conduit extending from the lower end of said second conduit downwardly through said gas supply zone, and a bayonet-type connector for removably attaching said third conduit to the lower end of said second conduit.

10. The device of claim 6, in which said annular solids-deflecting means comprises a short cylindrical member joined to the upper end, and forming a continuation, of said second conduit, said cylindrical member having integral therewith a series of concentric frusto-conical skirt-like baffles arranged one above the other in spaced overlapping relationship and being of progressively increasing mean diameter downwardly, the upper perimeter of the uppermost baffle being in fluid-tight connection with the outer surface of said cylindrical member, and each of the remaining baffles being supported from said cylindrical member and in open communication at its upper end with the space beneath the baffle next above.

11. The device of claim 10, in which said remaining baffles are integral with common radial web members extending outwardly from the outer surface of said cylindrical member, said web members being supported upon the upper end of said first conduit and being removably connected thereto.

12. In apparatus for contacting gas with a compact moving mass of solids, the combination of an elongated upright vessel, a horizontal tube-sheet separating said vessel internally into upper and lower contact zones and being adapted to support a first compact moving bed of said solids within said upper contact zone, means for supporting a second compact moving bed of said solids within said lower contact zone, a plurality of vertical solids-withdrawal conduits passing through said tube-sheet and having their end portions extending substantial distances above and below said tube-sheet, the upper ends of said conduits determining the lowermost level of moving solids in said first bed and the lower ends of said conduits determining the surface level of said second bed, solids-deflecting caps mounted upon and encircling the upper end portions of said conduits and forming therewith solids-free hollow annular spaces whose lowermost boundaries are defined by internal exposed annular surfaces of the static portion of said bed formed below said lowermost level, which surfaces are inclined at the angle of repose, means for introducing said gas into the plenum at the upper end of said lower contact zone containing the downwardly extending portions of said conduits and defined by the sides of said vessel, said tube-sheet, and the upper surface of said second bed, and means for conveying individual confined streams of said gas upwardly from said plenum into the hollow spaces beneath said caps in said upper contact zone.

13. Apparatus as defined in claim 12 in which said caps are provided with side openings arranged and adapted to pass said gas laterally from said annular spaces into the static portion of said upper bed without admitting solids from said bed into said annular spaces.

References Cited in the file of this patent
UNITED STATES PATENTS

| | | |
|---|---|---|
| 1,624,793 | Mann | Apr. 12, 1927 |
| 1,726,845 | Chillas | Nov. 26, 1929 |
| 2,389,493 | Evans | Nov. 20, 1945 |
| 2,412,135 | Evans | Dec. 3, 1946 |
| 2,480,887 | Strader | Sept. 6, 1949 |
| 2,494,337 | Hemminger | Jan. 10, 1950 |
| 2,507,325 | Throckmarton et al. | May 9, 1950 |
| 2,556,198 | Lassiat | Jan. 12, 1951 |
| 2,556,301 | Squires et al. | Jan. 12, 1951 |
| 2,568,379 | Berg | Sept. 18, 1951 |
| 2,636,805 | Lassiat et al. | Apr. 28, 1953 |

OTHER REFERENCES

Perry: "Chemical Engineers' Handbook," "Distillation," third edition, McGraw-Hill Book Co. publishers, N. Y. C.